Jan. 16, 1968 J. G. JERGESON 3,363,698
ROD MOVEMENT ARRESTING DEVICE
Filed Sept. 10, 1964 2 Sheets-Sheet 1

INVENTOR
JOHN G. JERGESON

BY Lane, Aitken, Dunner & Ziems
ATTORNEYS

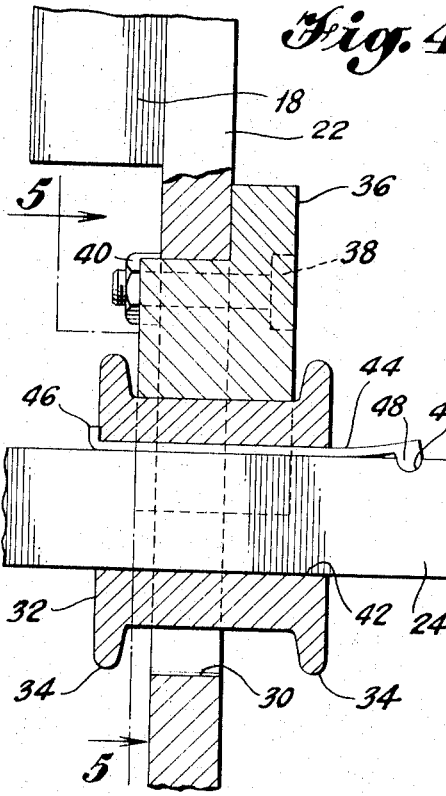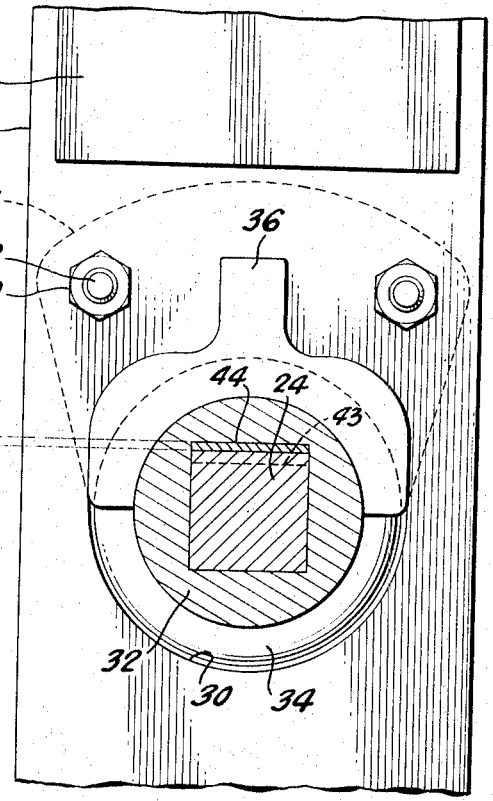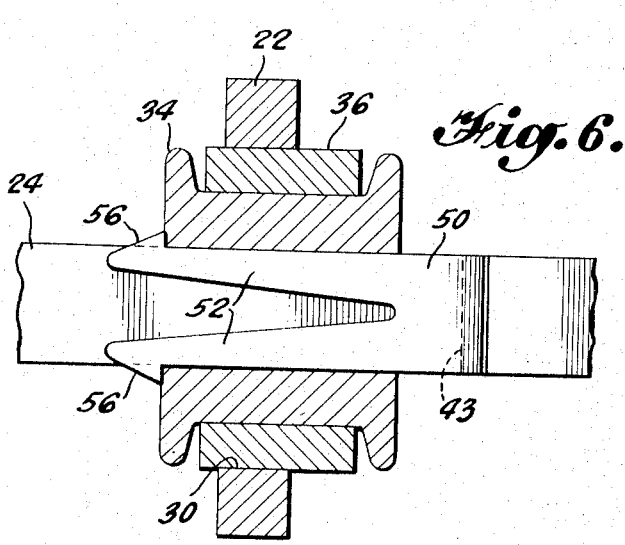

United States Patent Office 3,363,698
Patented Jan. 16, 1968

3,363,698
ROD MOVEMENT ARRESTING DEVICE
John G. Jergeson, Clear Creek Route,
Chinook, Mont. 59523
Filed Sept. 10, 1964, Ser. No. 395,472
6 Claims. (Cl. 172—44)

ABSTRACT OF THE DISCLOSURE

The present disclosure contains drawings and a description of a device for restricting axial movement of an elongated member or rod and an apertured member through which the rod projects. Although the device has broad application, the present disclosure shows, by way of example, the use of the device in a rod weeder; i.e., an agricultural machine which operates to pass a rotatable rod beneath the surface of soil to uproot weeds and the like and to provide a trashy cover.

---

This invention relates to devices for arresting longitudinal movement between a rod and an apertured member through which the rod extends. More particularly, it concerns rod anchorage devices having particular utility for arresting longitudinal movement of rods employed in agricultural machines known as rod weeders which are used to cultivate and produce a trashy cover on fallow ground to conserve moisture and to afford protection against blowing and erosion.

In the use of rod weeders, a transverse rod usually of square cross-section is drawn through the soil a few inches below the surface and rotated to uproot weeds so that they will be left on the surface to provide the desired trashy cover. The rod is conventionally supported for rotation from a frame by spools or stop collars journalled in gooseneck pendants spaced along the length of the rod and is rotatably driven by a suitable drive mechanism. In center-drive rod weeders, the drive mechanism may include a chain drive housed in a boot depending from the frame and equipped with an appropriate shoe for penetrating the soil. Because the rod rotates beneath the surface of the soil, and thus is exposed to wear by abrasion or bending by rocks and the like, it is important that the rod be easily removed and replaced in the field. Removal and/or replacement of the rod in center-drive rod weeders is carried out by moving the rod longitudinally through successive ones of the pendant carried stop collars in which it is mounted. To facilitate this operation and as well as to retain the rod in place during use, the stop collars, in the past, have been equipped with set screws by which the rod may be held against axial movement and yet released for removal and replacement. While the use of a set screw for this purpose particularly those of the Allen head type, has been reasonably effective, the head of the set screw often becomes partially or sometimes completely worn away or deformed due to the abrading action of the soil in which it is submerged during use. As a result, it becomes impossible to remove the set screw by tools intended for that purpose and much loss of time is incurred in attempting to remove a worn out or damaged rod in the field.

In accordance with the present invention the problems experienced with removing worn or damaged rods from rod weeders are substantially eliminated by employing resilient means for holding the rod in position. Structurally, the invention contemplates a generally flat resilient strap having an abutment in one end for engaging the apertured member through which it extends, or a stop collar in a rod weeder, and a detent on the other end to engage a recess formed in the rod. The strap is of such dimension that the aperture in a stop collar, for example, need only be enlarged slightly in one direction so that it will be received between the rod and the inside of the collar aperture.

It is therefore a principal object of this invention to provide a new and unique rod arresting device particularly for use in rod weeders and by which the problems heretofore associated with the removal and replacement of rods in rod weeders are effectively and substantially overcome.

It is a further object of this invention to provide a rod movement arresting device of the type referred to which is extremely simple in structure and thus economically manufactured and yet which is adaptable to existing equipment without substantial modification of that equipment.

Another object of this invention is the provision of a rod anchoring device for holding rods of the type employed in rod weeders against longitudinal movement with respect to a mounting pendant in which the rod is rotatably supported, which device is virtually unaffected by the abrasive effect of operation beneath the surface of soil so that removal of the rod in the field is virtually unimpaired.

Another object of this invention is to provide a rod anchorage device which though particularly suitable for use in connection with rod weeders of the type aforementioned, is useful in other environments where it is desired to arrest longitudinal movement of a rod with respect to an apertured member through which the rod extends.

Other objects and further scope of applicability of the present invention will become apparent from the detailed description given hereinafter taken in conjunction with the accompanying drawings in which:

FIGURE 4 is a fragmentary cross-section taken along the axis of the rod adapted to be held in place by the anchor device of this invention as it is assembled on a rod weeder;

FIGURE 5 is a fragmentary cross-section taken along line 5—5 of FIGURE 4; and

FIGURE 6 is a fragmentary cross-sectional view illustrating the use of alternative form of the present invention shown in FIGURE 3.

Figure 1:
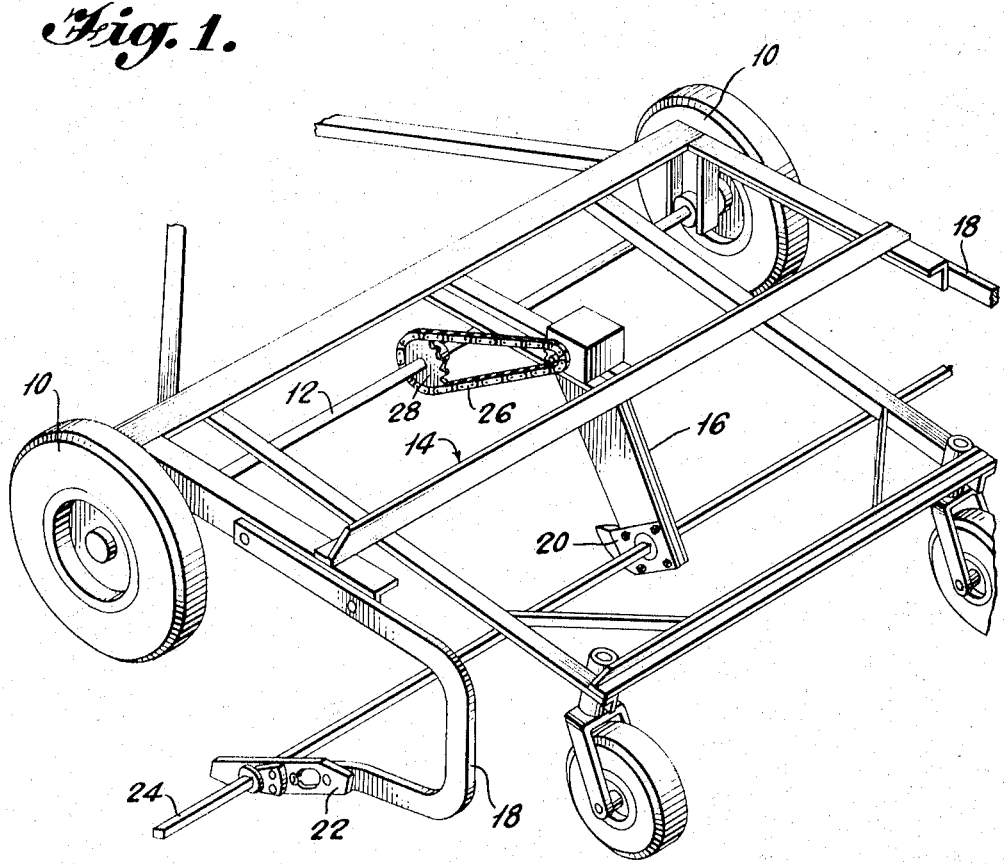
FIGURE 1 is a fragmentary perspective view illustrating a rod weeder of the type with which the present invention is particularly adapted for use.

Referring now to the drawings and particularly to FIGURE 1 thereof, a conventional center-drive rod weeder is shown to include wheels 10 coupled to an axle 12 in turn journalled in and supporting a frame 14 carrying a center-drive boot 16 and a plurality of gooseneck pendants 18 of which only one is completely shown in FIGURE 1 for purposes of clarity. The center boot 16 and gooseneck pendant 18 each carry soil penetrating shoes 20 and 22 respectively, which shoes are transversely aligned on the axis of a rod 24 of polygonal, or in this instance rectangular cross-section. The rod 24 is adapted to be rotatably driven by way of a drive transmission including a chain 26 connected to a drive sprocket 28 keyed to the axle 12. The remainder of the drive transmission is not shown in the drawings but in accordance with conventional practice includes further means such as additional chains and sprockets extending within the center boot 16. Since a complete disclosure of the details of the drive mechanism is not necessary to gain a full understanding and appreciation for the anchoring device of this invention these details are not shown. A complete disclosure of such details may be had however, by reference to U.S. Patents Nos. 3,072,198, Calkins et al.; and 3,101,786, Hunter et al.

The manner in which the rod 24 is rotatably supported in the shoe 22 carried on the lower end of the gooseneck pendant 18 is shown most clearly in FIGURES 4 and 5 of the drawings. This mounting arrangement conventionally involves an enlarged aperture 30 formed in the shoe 22 through which a stop collar 32 having annular flanges 34 on each end thereof may be inserted. A bearing block 36 is adapted to be received also in the aperture 30 and fixed in place such as by bolts 38 and nuts 40. It will be appreciated that with the bearing block 36 in place as shown in FIGURES 4 and 5, the stop collar 32 will be permitted to rotate in the aperture 30 but will not be permitted to move axially to any substantial extent because of the annular flanges 34.

Each of the components described thus far is in itself conventional with the exception of the specific stop collar 32 shown in the drawings. Heretofore, the stop collar has been formed with a central rectangular aperture for receiving the rod 24 without substantial play and at least one of the annular flanges 34 provided with a radial threaded bore for receiving a set screw to arrest relative axial movement between the rod 24 and the stop collar. In accordance with this invention however, the stop collar 34 is provided with a longitudinal aperture 42 of a cross-section generally complementing the cross-sectional configuration of the rod 24, the aperture 42 being offset slightly from the center of the collar 32 and slightly elongated in the direction of offset to provide a clearance a as shown in FIGURE 5 between one flat surface of the rod 24 and a corresponding interior flat surface of the aperture 42. Also, the rod 24 in accordance with this invention is provided with at least one transversely extending groove or recess 43 on the one flat surface thereof. The purpose of this slight modification of the stop collar 32 from the conventional stop collars heretofore employed to provide the clearance a as well as the recess 43 will be more completely understood from the description of the anchoring device of this invention and its method of use given below.

Figure 2:
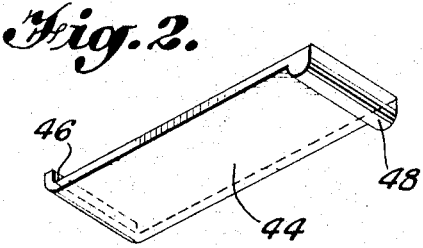
FIGURE 2 is a perspective view of one form of rod anchoring device in accordance with this invention.

One form of the anchoring device of this invention is shown in FIGURE 2 of the drawings to include an elongated resilient strap 44 having at one end an abutment in the form of a bent-over portion 46 and at its other end a detent 48 projecting in a direction opposite from that of the abutment 46. While the material from which the strap 44 is formed may be of any suitable sufficiently strong resilient material, spring steel strapping approximately 1/16 inch in thickness and of a width corresponding to the width of the aperture 42 in the stop collar 42 has been found in practice to be highly satisfactory.

In use, the anchoring device illustrated in FIGURE 2 is assembled between the stop collar 32 and the rod 24 as shown in FIGURES 4 and 5 by first holding the strap 44 in the aperture 42 and against the flat wall of the aperture 42 defining one side of the clearance a with the detent 48 projecting inwardly toward the aperture. The rod 24 is then inserted into the aperture 42 from the end of aperture at which the abutment 46 is positioned or from left to right as shown in FIGURE 4 of the drawings, causing the detent 48 to ride upwardly on the flat surface of the rod defining the other side of the clearance a and having the groove 43 formed therein. The rod is then fed through each of the remaining pendant carried stop collars until the detent 48 moves into the transverse groove 43. At this point, movement of the rod will be restricted by engagement of the abutment 46 with the end of the stop collar 32 and the retention of the detent 48 by the groove 43 in the rod. As shown most clearly in FIGURE 4 of the drawings the extent to which the detent 48 projects from the strap 44 exceeds somewhat the depth of the groove 43 in the rod 24. This dimensional difference results in the end of strap 44 on which the detent 48 is formed being sprung outwardly from the rod 24 thereby arresting movement of the rod 24 in a direction tending to separate the abutment 46 from the end of the stop collar 42 or in a direction proceeding from right to left as shown in FIGURE 4.

To remove the rod 24 for replacement or repair, the detent 48 is disengaged from the recess 43 by delivering a hammer blow to the end of the rod, preferably the end closest to the abutment 46, and the rod fed outwardly along its axis in the same direction as it was placed into the aperture 42.

Figure 3:
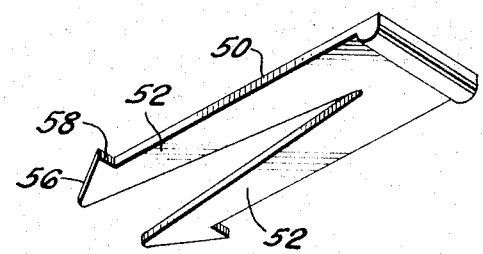
FIGURE 3 is a perspective view of a modified embodiment of the anchoring device of this invention.

In the alternative embodiment of FIGURE 3, a bifurcated strap of spring steel 50 is employed to define a pair of spaced legs 52 extending from the end on which a detent 54 is formed. The free ends of the legs 52 are provided with forwardly converging cam surfaces 56 terminating rearwardly in abutment shoulders 58. This embodiment has as an advantage, the facility for being placed into the clearance a between the aperture 42 and the rod 24 after the rod is in place. In other words, since the shoulders 58 defining the abutment for engaging the end of the stop collar 34 do not in any way increase the thickness of the strap 50, the ends of the leg 52 defining the cam surfaces 56 may be partially inserted into the aperture 42 and the strap driven into place. This is possible because of the inward deflection of the legs 52 as a result of the cam surfaces 50 and resiliency of material from which the legs are formed. Once in place as shown in FIGURE 6 of the drawings, the strap 50 operates to arrest movement of the rod 24 with respect to the stop collar 32 in the same manner as the embodiment of FIGURE 2.

Thus it will be seen that by this invention an extremely effective means is provided for anchoring a rod relative to an apertured member through which it extends. As described above, the anchorage device is particularly suitable to arrest movement of the rod in a rod weeder since removal of the rod will under no circumstances be impeded by abrasive wear of the device, regardless of the extent of such wear. In this respect, adequate anchorage may be effected by employing the arrangement shown in FIGURES 4-6 in only one of the multiple gooseneck pendants provided in conventional rod weeders or, if desired, each of the pendants may incorporate the anchorage device of this invention. The embodiment of FIGURES 3 and 6 is especially suited to this purpose because, being insertable with the rod 24 in place, two of the straps 50 may be used in two separate pendants 18 respectively with each of the straps inserted from opposite directions. In this manner, the rod will be fully anchored against movement in either direction by the abutment shoulders 58 engaging opposite ends of the respective stop collars with which they are used.

Also, it is contemplated that the anchorage device of this invention will have utility in environments apart from rod weeders. Since, therefore, many modifications and different uses will be apparent to those skilled in the art, it is to be distinctly understood that the above description is illustrative only, not limiting, and that the true spirit and scope of the present invention is to be determined from the appended claims.

What is claimed is:

1. In combination: a member having a pair of spaced end faces and an aperture extending between said end faces, a rod extending through said aperture, said rod and said aperture each having at least one complementing longitudinally extending flat surface, and a substantially flat resilient strap extending through said member and lying between said flat surfaces, said strap having abutment means on one end to engage one of the end faces on said member and detent means on the other end thereof for engaging said rod, said detent means being spaced from said abutment means by a distance greater than the spacing of said end faces, said rod having a recess in said flat surface thereon for receiving said detent means, the depth of said recess being less than the projecting extent of said detent means whereby said other end of said strap is held away from said rod to restrict axial movement between said rod and said member in a direction separating said member and said abutment means.

2. The combination recited in claim 1 in which the aperture extending through said member is offset in the direction of the flat surface therein to define a clearance between said aperture and said rod to accommodate said strap while maintaining axial alignment of said rod and said member.

3. A rod anchorage device for use in rod weeders of the type including a plurality of pendants each having an apertured stop collar having spaced end faces and journalled in a soil penetrating shoe for rotatably supporting a rod under the surface of the soil, said device comprising: a resilient strap adapted to extend through said stop collar adjacent said rod, said strap having abutment means on one end for engagement with one end face on said stop collar and detent means on the other end for engagement with said rod, said detent being spaced from said abutment means by a distance greater than the spacing of said end faces, whereby said detent is axially displaced from said stop collar when said device is assembled with the stop collar and rod in use to urge the other end of said strap away from the rod by engagement of said detent with the rod, thereby restricting axial movement between the rod and the stop collar in a direction separating the stop collar from said abutment means.

4. A device as recited in claim 3 in which said strap is a generally rectangular shaped piece of spring steel and in which said abutment means is a bent-over portion on said one end of said strap.

5. The device as recited in claim 3 in which said strap is bifurcated to define a pair of legs, each of said legs terminating in forwardly converging cam surfaces and having laterally extending shoulders adjacent said cam surfaces to define said abutment means.

6. In a rod weeder of the type including a plurality of rod-supporting pendants each having a soil-penetrating shoe at its lower end, the combination comprising: a stop collar journaled for rotation in said shoe and having an aperture extending axially therethrough, a rod adapted to extend through said stop collar and having a recess formed therein to be spaced slightly from an end of said collar when said rod is in its operative position, and means for arresting axial movement of said rod relative to said stop collar, said means comprising a resilient strap positionable within said aperture adjacent said rod and having a detent on one end receivable in said recess, and an abutment means on the other end to engage the other end of said stop collar, the extent to which said detent projects from said strap being greater than the depth of said recess, whereby said one end of said strap will be urged away from said rod to restrict axial movement of said rod relative to said stop collar in a direction tending to separate said stop collar and said abutment means.

References Cited

UNITED STATES PATENTS

| | | | |
|---|---|---|---|
| 664,027 | 12/1900 | O'Meara | 287—52.05 X |
| 881,691 | 3/1908 | Hughes | 287—52.09 X |
| 959,475 | 5/1910 | Davis | 287—52.02 |
| 1,684,992 | 9/1928 | Jackson | 172—44 |
| 2,588,064 | 3/1952 | Webb | 287—52.05 |
| 2,697,621 | 12/1954 | Frederick | 287—52.09 |
| 2,862,433 | 12/1958 | Guyer | 172—44 |
| 3,164,402 | 1/1965 | Jobe | 287—52.05 |
| 3,245,365 | 4/1966 | Doherty | 287—52.05 X |

ABRAHAM G. STONE, *Primary Examiner.*

WILLIAM A. SMITH III, *Examiner.*

A. E. KOPECKI, *Assistant Examiner.*